United States Patent
Kimball

(10) Patent No.: US 9,507,416 B2
(45) Date of Patent: Nov. 29, 2016

(54) PROVIDING A CORRECTED VIEW BASED ON THE POSITION OF A USER WITH RESPECT TO A MOBILE PLATFORM

(76) Inventor: Robert Howard Kimball, Encinitas, CA (US)

( * ) Notice: Subject to any disclaimer, the term of this patent is extended or adjusted under 35 U.S.C. 154(b) by 1118 days.

(21) Appl. No.: 13/032,493

(22) Filed: Feb. 22, 2011

(65) Prior Publication Data

US 2012/0212508 A1 Aug. 23, 2012

(51) Int. Cl.
| | |
|---|---|
| G06F 3/01 | (2006.01) |
| G02B 27/00 | (2006.01) |
| G06F 3/00 | (2006.01) |
| G06F 3/0346 | (2013.01) |
| G06T 19/00 | (2011.01) |

(52) U.S. Cl.
CPC ........... *G06F 3/012* (2013.01); *G02B 27/0093* (2013.01); *G06F 3/005* (2013.01); *G06F 3/0346* (2013.01); *G06T 19/006* (2013.01)

(58) Field of Classification Search
CPC ..... G06T 19/006; G06T 19/00; G06F 3/011; G06F 3/021; G02B 27/017
See application file for complete search history.

(56) References Cited

U.S. PATENT DOCUMENTS

| | | | |
|---|---|---|---|
| 5,815,411 A | 9/1998 | Ellenby et al. | |
| 5,936,596 A * | 8/1999 | Yoshida et al. | 345/9 |
| 7,737,965 B2 | 6/2010 | Alter et al. | |
| 2002/0075286 A1* | 6/2002 | Yonezawa | G02B 27/017 345/679 |
| 2005/0093889 A1* | 5/2005 | Sauer et al. | 345/633 |
| 2006/0050087 A1 | 3/2006 | Tanimura et al. | |
| 2008/0027599 A1* | 1/2008 | Logan et al. | 701/23 |
| 2009/0060291 A1* | 3/2009 | Ohtani | G06K 9/00281 382/118 |
| 2009/0097705 A1 | 4/2009 | Thorn | |
| 2010/0053151 A1 | 3/2010 | Marti et al. | |
| 2010/0079449 A1 | 4/2010 | McCarthy | |
| 2010/0125816 A1 | 5/2010 | Bezos | |
| 2011/0159957 A1 | 6/2011 | Kawaguchi et al. | |
| 2011/0248987 A1* | 10/2011 | Mitchell | 345/419 |

FOREIGN PATENT DOCUMENTS

| | | |
|---|---|---|
| CN | 1574884 A | 2/2005 |
| CN | 101566875 A | 10/2009 |

(Continued)

OTHER PUBLICATIONS

International Search Report and Written Opinion—PCT/US2012/026097—ISA/EPO —June 12, 2012.

(Continued)

*Primary Examiner* — Michelle Chin
(74) *Attorney, Agent, or Firm* — Linda Gunderson; Scott A. Barker

(57) ABSTRACT

A mobile platform displays a corrected view of an image and/or augmented reality (AR) data based on the position of the user with respect to the mobile platform. The corrected view is produced by determining a position of the user with respect to the mobile platform using an image of the user from a backward facing camera. The display information is provided in the form of an image or video frame of the environment captured with a forward facing camera or AR data. The position of the user with respect to the mobile platform is used to determine the portion of the display information to be displayed that is aligned with the line of sight between the user and the mobile platform so that the displayed information is aligned with the real world environment.

23 Claims, 6 Drawing Sheets

(56) References Cited

FOREIGN PATENT DOCUMENTS

| EP | EP2098821 A1 | 9/2009 |
| EP | EP-2305358 A1 | 4/2011 |
| GB | GB2465280 A | 5/2010 |
| JP | JP-H09505138 A | 5/1997 |
| JP | JP-2004280156 A | 10/2004 |
| JP | JP-2008502206 A | 1/2008 |
| KR | 1019960705297 | 10/1996 |
| WO | WO2004113991 A2 | 12/2004 |
| WO | WO-2005122582 A2 | 12/2005 |
| WO | WO-2010001756 A1 | 1/2010 |

OTHER PUBLICATIONS

Karpischek et al. "SwissPeaks—Mobile augmented reality to identify mountains." In Workshop at the International Symposium on Mixed and Augmented Reality 2009 [Online] 2009, 2 pages.

* cited by examiner

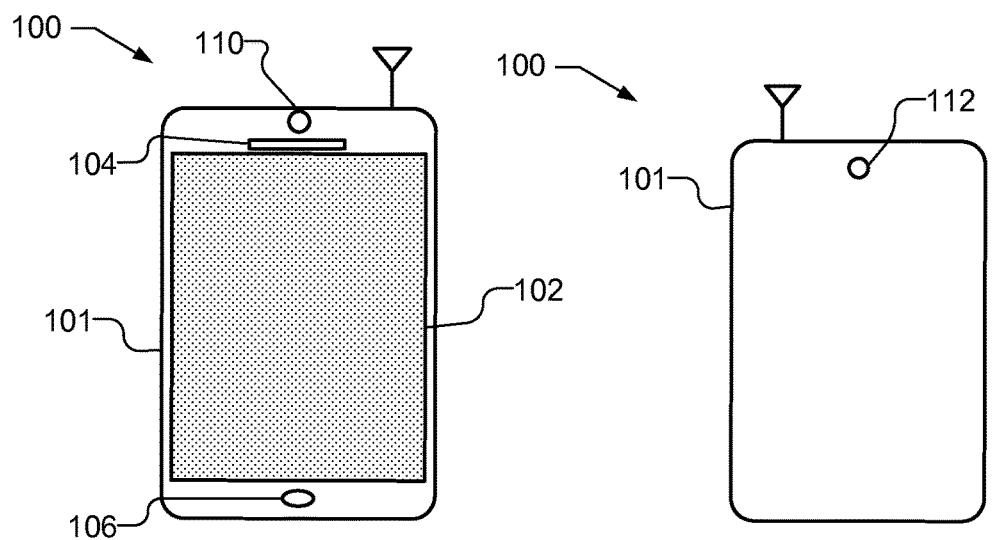
Fig. 1A
Fig. 1B
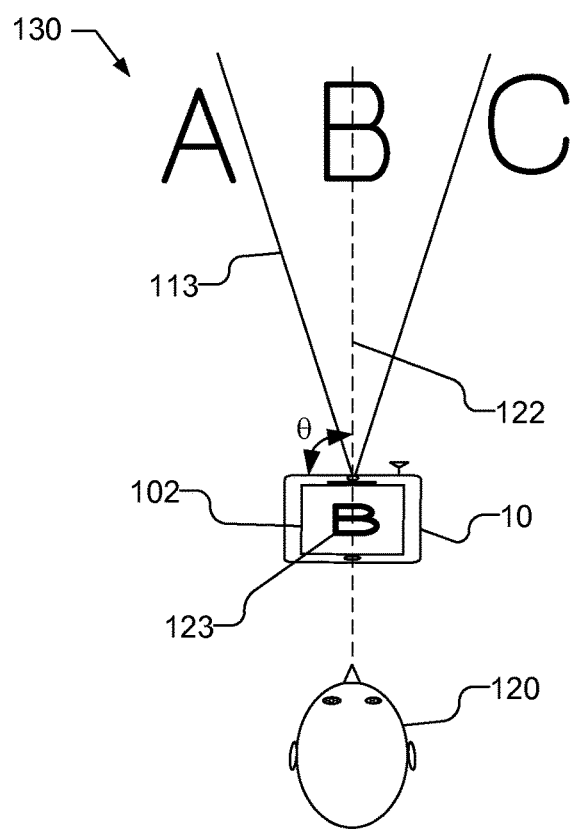
Fig. 2

PROVIDING A CORRECTED VIEW BASED ON THE POSITION OF A USER WITH RESPECT TO A MOBILE PLATFORM

BACKGROUND

One of the uses enabled with the knowledge of the location of a portable electronic device, typically determined using a satellite position system (SPS), such as the well-known Global Positioning Satellite (GPS) system or Global Navigation Satellite System (GNSS), along with on board motion sensors, is augmented reality (AR) applications. Augmented reality combines real-world imagery with computer generated data, such as graphics or textual information. In order to properly align the computer generated data with the intended object in the image, the location of the imaging device must be known. When the imaging device has a fixed position, such a television camera, the location of the imaging device can be easily determined. With a mobile device, however, the location must be tracked.

The location of the imaging device used in AR applications, however, does not take into account the relationship of the user with the camera. Thus, while the AR overlay data may be aligned with the image of the real world, the AR overlay data, as well as the image of the real world may not be properly aligned with the real world. FIG. 8, by way of example, illustrates a conventional mobile platform 10 with a display 11 showing an image 12 of the stars in the Big Dipper constellation along with an AR image 14 that is rendered over the image of stars. The image 12 of the stars may be an image captured by a camera on the mobile platform 10 or an AR generated image. FIG. 8 also illustrates real world stars 16 forming a portion of the Big Dipper constellation, some of which are hidden behind the mobile platform 10. As can be seen, the image 12 of the stars and the AR image 14 are not aligned with the real world stars 16. Thus, alignment of the displayed images and computer generated data with the real world is left to the user, many of whom find this task distracting and difficult.

SUMMARY

A mobile platform displays a corrected view of an image and/or augmented reality (AR) data based on the position of the user with respect to the mobile platform. The information to be displayed may be an image or video frame of the environment captured with a forward facing camera as well as AR data, such as text or graphics, which may be displayed by itself or over the image. The corrected view is produced by determining a position of the user with respect to the mobile platform using an image of the user from a backward facing camera. For example, the position of the user within the image can be used to determine the position of the user with respect to the mobile platform and the line of sight between the user and the mobile platform. The position of the user with respect to the mobile platform is used to determine the portion of the display information to be displayed that is aligned with the mobile platform so that the displayed AR information is aligned with the line of sight between the user and the mobile platform so that the displayed information is aligned with the real world environment. Additionally, the distance between the user and the mobile platform may be used to determine the portion of the display information to be displayed. The distance between the user and the mobile platform may be determined, e.g., using a biometric analysis of the user within the image.

BRIEF DESCRIPTION OF THE DRAWING

FIGS. 1A and 1B illustrate a front side and back side, respectively, of a mobile platform capable of displaying a corrected view of display information based on the position of the user with respect to the mobile platform.

FIG. 2 illustrates a top view of a conventional mobile platform, a user, and the environment, where the mobile platform is held perpendicular to the line of sight.

DETAILED DESCRIPTION

Figure 3:
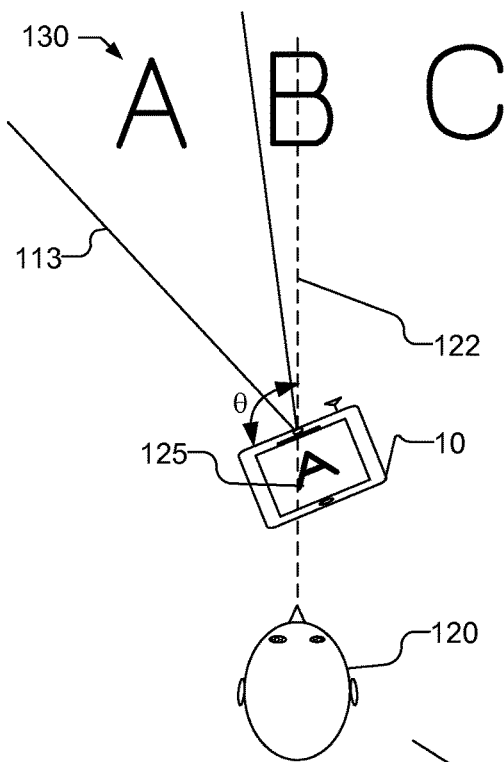
FIG. 3 illustrates another top view of a conventional mobile platform, a user, and the environment, where the mobile platform is held rotated with respect to the line of sight so that the displayed image is not aligned with the line of sight of the user.

FIGS. 1A and 1B illustrate a front side and back side, respectively, of a mobile platform 100, capable of displaying a corrected view of display information based on the position of the user with respect to the mobile platform 100. The display information may include an image of the environment captured by the mobile platform, where a captured image includes a single image, e.g., photograph, or one or more frames of video. The display information may also or alternatively include augmented reality (AR) data, such as text or graphics, that is rendered to be displayed by the mobile platform. By correcting the view of the information that is displayed, the display information, e.g., the captured image and/or AR data, is aligned with the real world environment.

As used herein, a mobile platform refers to any portable electronic device such as a cellular or other wireless communication device, personal communication system (PCS) device, personal navigation device (PND), Personal Information Manager (PIM), Personal Digital Assistant (PDA), or other suitable mobile device. The mobile platform may be capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all electronic devices, including wireless communication devices, computers, laptops, tablet computers, etc. which are capable of AR.

The mobile platform 100 is illustrated as including a housing 101, a display 102, which may be a touch screen display, as well as a speaker 104 and microphone 106. The mobile platform 100 further includes a forward facing camera 112 to image the environment and a backward facing camera 110 to image the user. Based on the image of the user from the backward facing camera 110, the orientation of the mobile platform 100 with respect to the user can be determined, from which the line of sight between the user and the mobile platform 100 and/or the desired field of view to be displayed may be determined. Based on position of the user with respect to the mobile platform 100, the display information to be displayed on display 102 may be corrected so that it is aligned with respect to the real world.

FIG. 2 illustrates a top view of a conventional mobile platform 10 (foreshortened in this view) and a user 120 and also illustrates the real world environment 130 being imaged by the mobile platform 10 as letters "A", "B", and "C". FIG. 2 also illustrates the field of view 113 of the forward facing camera 112 (FIG. 1B). A line of sight 122 between the user 120 and the mobile platform 10 is illustrated with a broken line extending from the user 120 through the mobile platform 10 and into the environment 130 intersecting the letter "B". In FIG. 2, the mobile platform 10 is held in a non-rotated manner so that the mobile platform 10 is held perpendicular to the line of sight 122, i.e., $\theta=90°$. In other words, the field of view 113 of camera 112 and the line of sight 122 of the user 120 are aligned. Accordingly, the portion of the environment 130 that is shown on display 102 is along the line of sight 122, as illustrated by the letter "B" appearing as the displayed image 123.

FIG. 3 illustrates another top view of the conventional mobile platform 10, user 120 and environment 130, but with the mobile platform 100 rotated with respect to the line of sight 122 of the user 120 so that the mobile platform 10 is not perpendicular to the line of sight 122, i.e., $\theta \neq 90°$. As can be seen in FIG. 3, the displayed image 125 produced when the mobile platform is rotated with respect to the line of sight 122 is centered on the field of view 113, in this example, the letter "A", even though the line of sight 122 of the user 120 is directed towards a different portion of the environment 130, i.e., the letter "B". Accordingly, the displayed image 125 is not aligned with the real world environment 130 from the perspective of the user 120.

Figure 4:
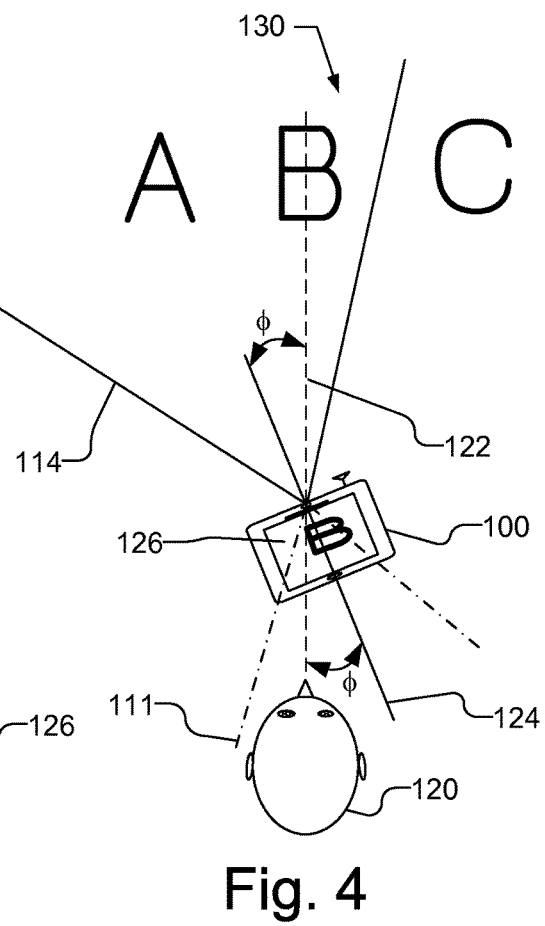
FIG. 4 illustrates a top view of a mobile platform, a user, and the environment, where the mobile platform is held rotated with respect to the line of sight, but the mobile platform corrects the view to display an image of the environment that is aligned with the line of sight.
Figure 5:
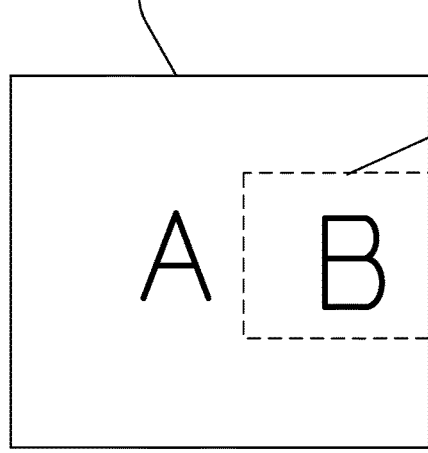
FIG. 5 illustrates an image of the environment captured by the forward facing camera of the mobile platform and shows the cropped portion of the image that is aligned with the line of sight of the user in FIG. 4 to form the image that is displayed by the mobile platform.

FIG. 4 illustrates a top view of mobile platform 100, which is capable of displaying a corrected view based on the position of the user 120 with respect to the mobile platform 100. FIG. 4 is similar to FIG. 3, but illustrates the field of view 111 of the backward facing camera 110, which images the user 120. Using the image of the user 120 from the backward facing camera 110, the mobile platform 100 can determine the position of the user 120 with respect to the mobile platform 100. Based on the position of the user 120 with respect to the mobile platform 100, the portion of the environment 130 that is along the line of sight 122 between the user 120 and the mobile platform 100 may be determined and displayed. For example, using facial recognition, mobile platform 100 can determine the position of the user 120 in the image produced by the backward facing camera 110. As shown in FIG. 4, the user 120 is off the center of the field of view 111, indicated by line 124, by an angle $\phi$. The center line 124 of the field of view 111, for example, may be based on the center point between the eyes of the user 120, which can be easily found based on facial recognition. The line of sight 122, accordingly, is off center from the field of view 114 of the forward facing camera 112 by approximately the same angle $\phi$, in the opposite direction. Using the off-center angle $\phi$ of the user 120, or equivalently the position of the user 120 within the image, or line of sight 122, the mobile platform 100 can correct the image captured by the field of view of camera 112 so that the portion of the environment 130 that is displayed is aligned with the line of sight 122, illustrated by the letter "B", appearing as the displayed image 126. The displayed image 126 may be produced, e.g., by cropping the image captured by the camera 112. In other words, instead of displaying the entire image captured by the camera 112, the image is cropped to display only the portion that is aligned, i.e., centered on, the line of sight 122. FIG. 5, by way of example, illustrates the entire captured image 128 of the portion of the environment 130 in the field of view 114 of the camera 112 and shows the cropped portion of the image that is aligned with the line of sight 122 that forms the displayed image 126. It should be understood that mobile platform 100 may correct the view of the mobile platform 100 for vertical rotation, i.e., variation in pitch or elevation, in the same manner.

Figure 6:
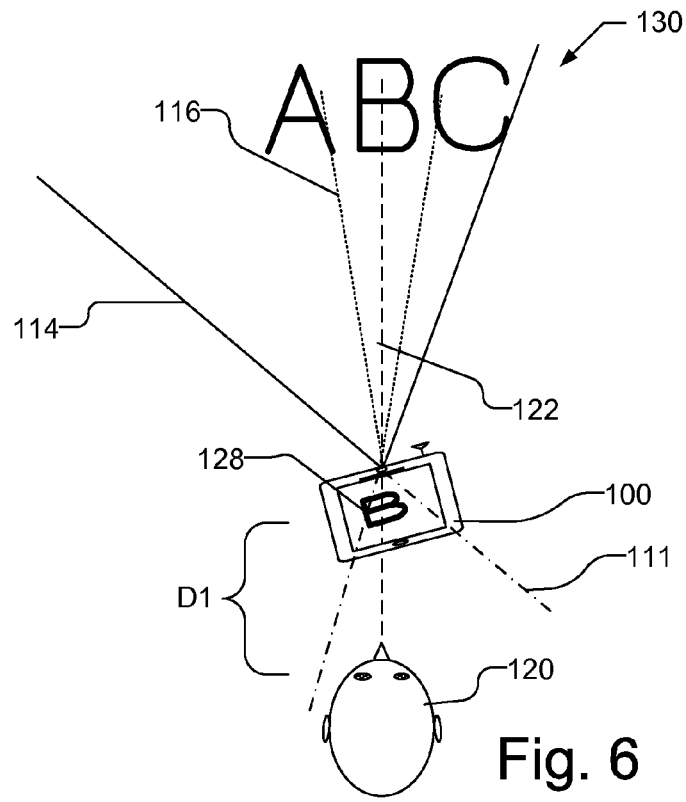
FIGS. 6 and 7 illustrate the mobile platform similar to FIG. 4, where the distance between the user and the mobile platform is determined and used to adjust the field of view of the displayed image.
Figure 7:
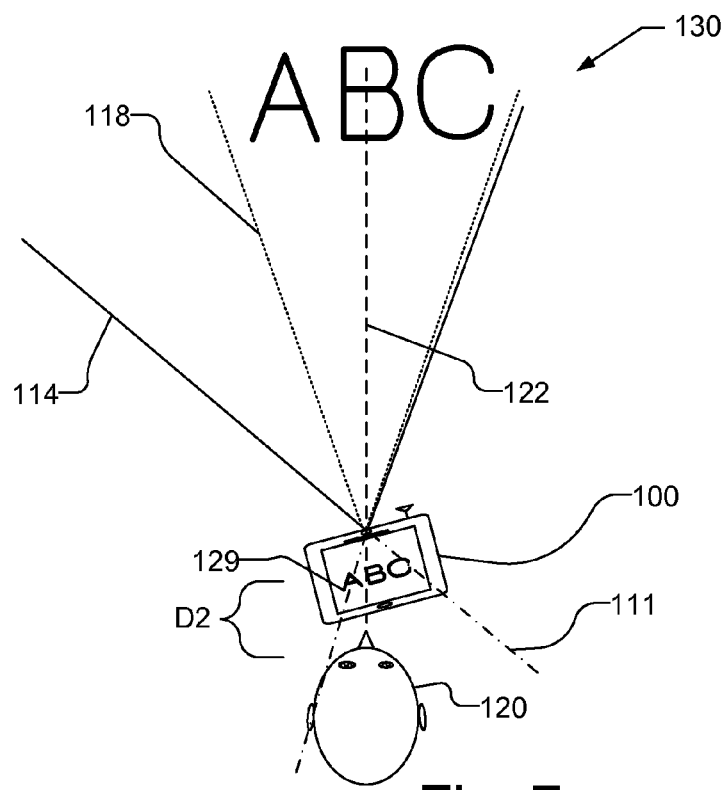

Additionally, the field of view to be displayed, i.e., the portion of the image that is aligned with the line of sight 122, may be adjusted based on the distance between the user 120 and the mobile platform 100. FIGS. 6 and 7, for example, illustrate the mobile platform 100 similar to FIG. 4, where the distance between the user 120 and the mobile platform 100 is determined and used to adjust the displayed field of view. For example, FIG. 6 shows a greater distance D1 between the user 120 and the mobile platform 100 and, accordingly, shows a relatively narrow field of view 116 resulting in displayed image 128, while FIG. 7 shows a smaller distance D2 between the user 120 and the mobile platform 100 and, accordingly, shows a relatively wider field of view 118 resulting in a different displayed image 129. The distance between the user 120 and the mobile platform 100 may be determined, e.g., using the camera's autofocus range finder or using a biometric analysis based on a calibrated or estimated distance between the eyes or the width the head of the user 120. With the use of biometrics, a one-time calibration procedure may be performed to accurately determine the distance to a particular viewer, where the calibration data could be associated with the identity of the viewer using facial recognition. Other methods of determining distance from the mobile platform 100 to the user 120, e.g., using other sensors may be used as well or in the alternative. Thus, the portion of the environment 130 centered on the line of sight 122 to be displayed is determined using the distance between the user 120 and the mobile platform 100.

Figure 8:
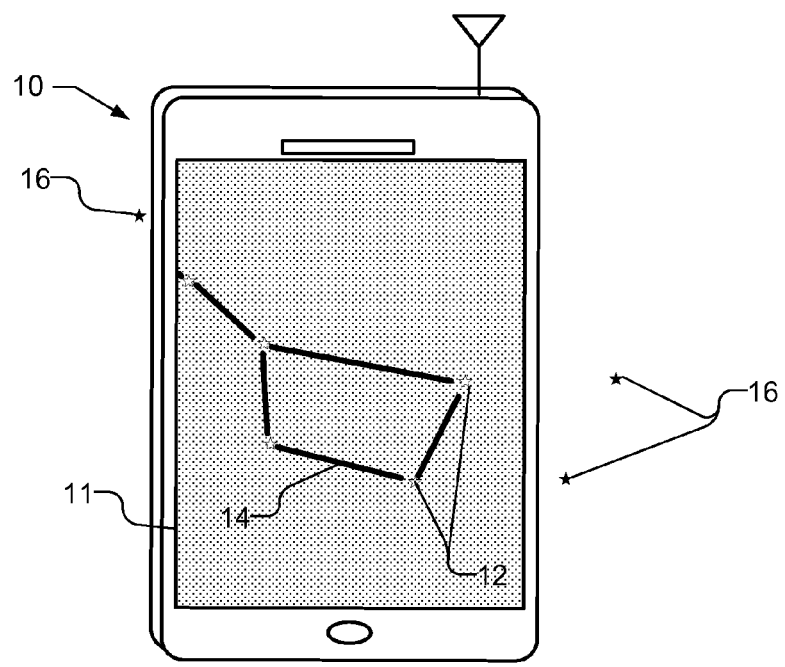
FIG. 8 illustrates a conventional mobile platform with an image and augmented reality data unaligned to the real world environment.
Figure 9:
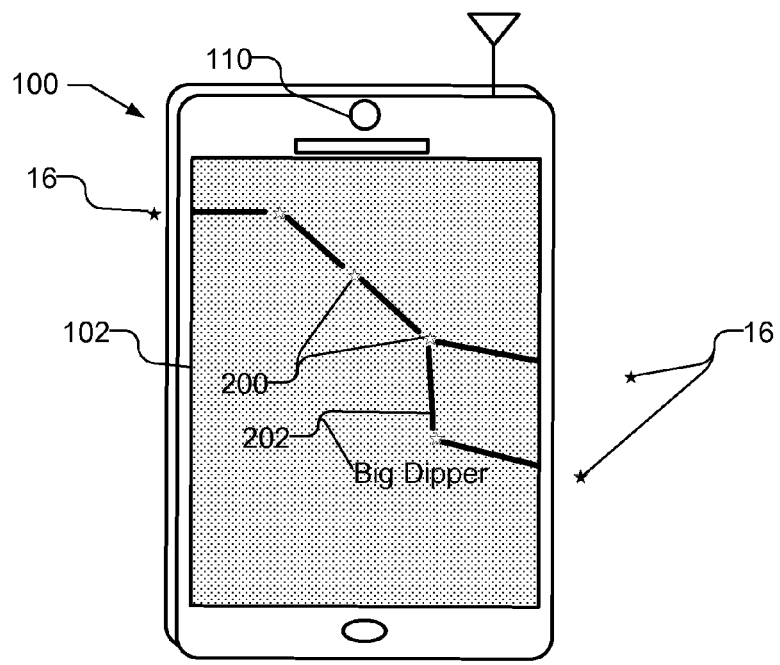
FIG. 9 illustrates a mobile platform that corrects the view that is displayed based on the position of the user with respect to the mobile platform so that the displayed image and augmented reality data are aligned to the real world environment.

FIG. 9 is similar to FIG. 8, discussed above, but shows the mobile platform 100 displaying a corrected view with respect to the real world environment. Similar to FIG. 8, FIG. 9 illustrates the real world stars 16 forming the Big Dipper constellation, some of which are hidden behind the mobile platform 100. FIG. 9 also shows a corrected view of the image 200 of the stars and the AR data 202, including graphics and text, based on the position of the user with respect to the mobile platform 100 so that the image 200 and AR data 202 is aligned with the real world stars 16. The image 200 of the stars may be an image captured by camera 112 or may be an AR generated image.

Figure 10:
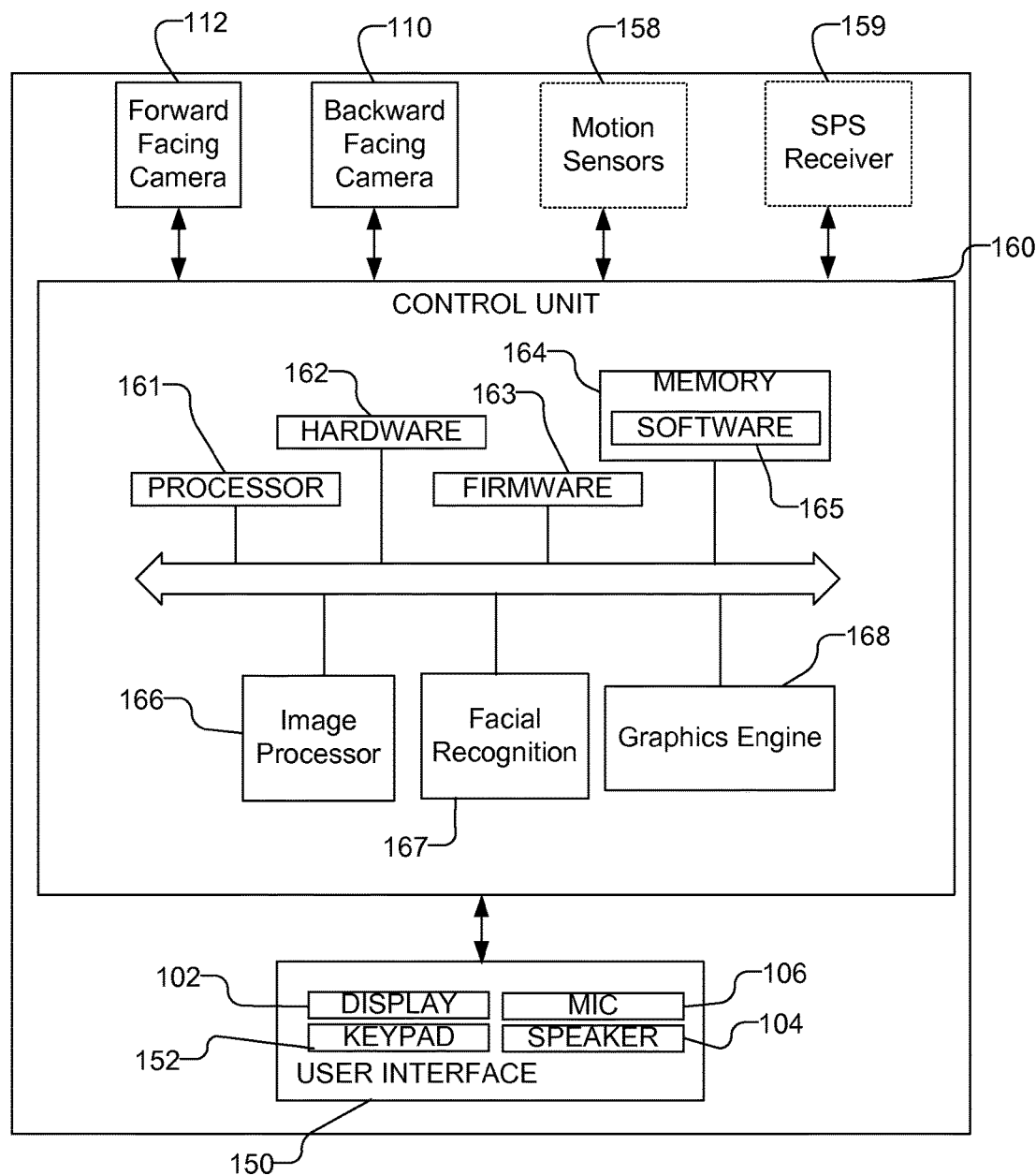
FIG. 10 is a block diagram of a mobile platform that corrects the view that is displayed based on the position of the user with respect to the mobile platform.

FIG. 10 is a block diagram of a mobile platform 100 that corrects the view based on the position of the user with respect to the mobile platform 100 so that the displayed information, i.e., captured image and/or AR data, is aligned with the real world environment. The mobile platform 100 includes the forward facing camera 112 and the backward facing camera 110 as well as a user interface 150 that includes the display 102 capable of displaying images captured by the cameras 110, 112. The user interface 150 may also include a keypad 152 or other input device through which the user can input information into the mobile platform 100. If desired, the keypad 152 may be obviated by integrating a virtual keypad into the display 102 with a touch sensor. The user interface 150 may also include a microphone 106 and speaker 104, e.g., if the mobile platform is a cellular telephone.

The mobile platform 100 may optionally include additional features that may be helpful for AR applications, such as a motion sensor 158, e.g., including accelerometers, gyroscopes, electronic compass, or other similar motion sensing elements and a satellite positioning system (SPS) receiver 159 capable of receiving positioning signals from an SPS system. Mobile platform 100 may include other position determination methods such as object recognition using "computer vision" techniques. Of course, mobile platform 100 may include other elements unrelated to the present disclosure, such as a wireless transceiver.

The mobile platform 100 also includes a control unit 160 that is connected to and communicates with the cameras 110 and 112 and user interface 150, along with other features, such as the motion sensor 158 and SPS receiver 159 if used. The control unit 160 accepts and processes data from the cameras 110 and 112 and controls the display 102 in response. The control unit 160 may be provided by a processor 161 and associated memory 164, hardware 162, software 165, and firmware 163. The mobile station 100 may include an image processor 166 for processing the images from the cameras 110 and 112 and a facial recognition unit 167 to identify the position of the user in the image from backward facing camera 110. The control unit 160 may further include a graphics engine 155, which may be, e.g., a gaming engine, to render desired AR data in the display 102. Together, the image processor 166 and facial recognition unit 167 may be used to determine the position of the user with respect to the mobile platform 100, while the image processor 166 may then be used to appropriately modify the image from the forward facing camera 112. The graphics engine 155 may retrieve AR data from storage (e.g., in memory 164) that is within the field-of-view aligned with the line of sight of the user based on the position of the user with respect to the mobile platform 100. The image processor 166, facial recognition unit 167 and graphics engine are illustrated separately from processor 161 for clarity, but may be part of the processor 161 or implemented in the processor based on instructions in the software 165 which is run in the processor 161. It will be understood as used herein that the processor 161 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored. Herein, the phrase "at least one of A and B" means at least one A, at least one B, or some combination of A and B.

The methodologies described herein may be implemented by various means depending upon the application. For example, these methodologies may be implemented in hardware 162, firmware 163, software 165, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 164 and executed by the processor 161. Memory may be implemented within or external to the processor 161.

If implemented in firmware and/or software, the functions may be stored as one or more instructions or code on a computer-readable medium manufactures. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 11:
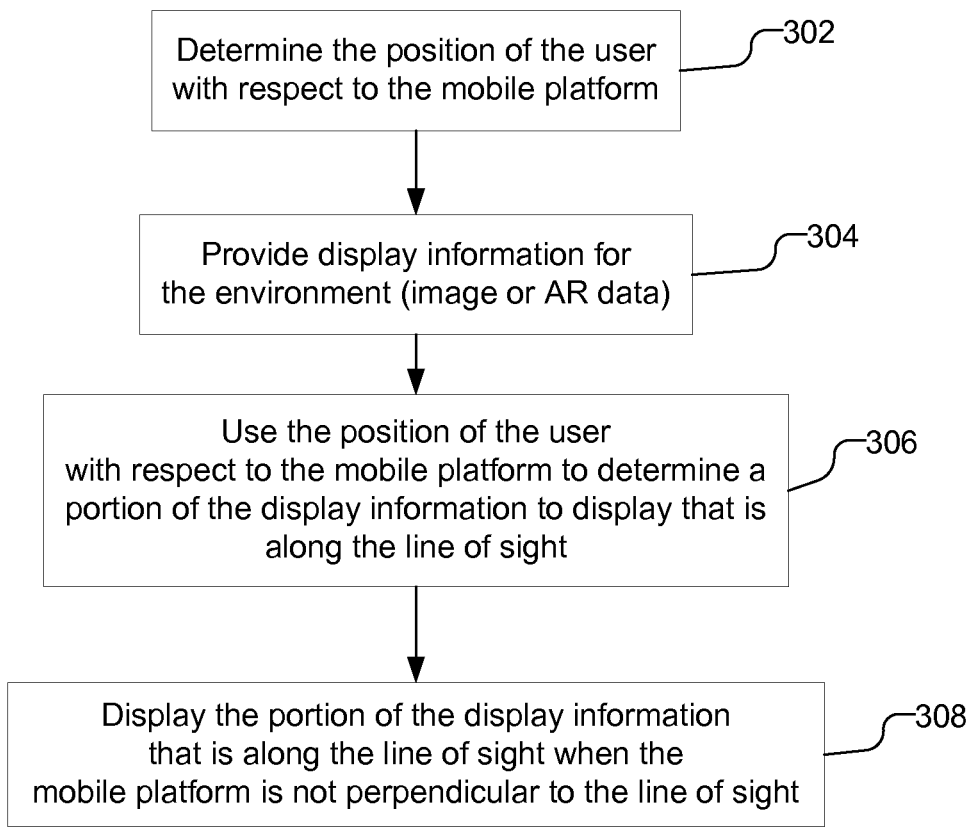
FIG. 11 is a flow chart showing a method of correcting the view that is displayed by the display of the mobile platform based on the position of the user with respect to the mobile platform.

FIG. 11 is a flow chart showing a method of correcting the displayed view based on the position of the user with respect to the mobile platform so that the displayed information is aligned with the real world environment. As illustrated in FIG. 11, the position of the user with respect to the mobile platform is determined (302). As discussed above, the position of the user with respect to the mobile platform may be determined by imaging the user 120 with the backward facing camera 110. The position of the user 120 in the image is determined, from which the position of the user with respect to the mobile platform may be determined, e.g., as an off-center angle $\phi$ or otherwise.

Display information for the environment is provided (304), which may be, e.g., an image of the environment as captured by the forward facing camera 112 and/or AR data that is to be rendered on the display. The position of the user with respect to the mobile platform is used to determine a portion of the display information that is to be displayed that is aligned with a line of sight between the user and the mobile platform (306). For example, as discussed above, the portion of the image of the environment may be cropped so that the portion of the image aligned with the line of sight between the user and the mobile platform is retained while the remainder of the image is removed. For AR data, the field-of-view for the portion of the AR data to be displayed may be determined based on the position of the user with respect to the mobile platform 100, as well as the position and orientation of the mobile platform 100, e.g., with respect to a global reference frame, which may be determined based on SPS receiver 159 and on-board motion sensor 158 (FIG. 10). The field-of-view is passed to a database, e.g., stored in memory 164, to retrieve any AR data within the field-of-view. The AR data is then formatted for display and then overlayed on the captured image or simply displayed on the display 102 (no overlay).

The portion of the display information that is along the line of sight of the user 120 is then displayed on the display 102 (308). Thus, when the mobile platform 100 is not perpendicular to the line of sight, i.e., the mobile platform is facing a direction that is not along the line of sight, the displayed image will be aligned with the line of sight.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   determining a position of a user with respect to a mobile platform;
   providing display information for an environment, the display information comprising at least one of an image of the environment or augmented reality data;
   using the position of the user with respect to the mobile platform to determine a portion of the display information to display that is aligned with a line of sight between the user and the mobile platform, wherein the portion of the display information is less than the entirety of the display information; and
   displaying only the portion of the display information that is aligned with the line of sight between the user and the mobile platform when the mobile platform is facing a direction that is not along the line of sight.

2. The method of claim 1, wherein displaying the portion of the display information that is aligned with the line of sight between the user and the mobile platform comprises at least one of displaying a portion of the image, displaying augmented reality data, or displaying augmented reality data over the portion of the image.

3. The method of claim 1, wherein determining the position of the user with respect to the mobile platform comprises:
   capturing an image of the user with a backward facing camera on the mobile platform; and
   analyzing the image of the user to determine the position of the user within the image.

4. The method of claim 1, further comprising:
   determining a distance between the mobile platform and the user; and
   using the distance between the mobile platform and the user to further determine the portion of the display information to display, wherein an increased portion of the display information is displayed when the distance between the mobile platform and the user is decreased.

5. The method of claim 4, wherein determining the distance between the mobile platform and the user comprises:
   capturing an image of the user with a backward facing camera on the mobile platform; and
   analyzing the image of the user using biometrics to determine the distance between the mobile platform and the user.

6. The method of claim 1, wherein providing the display information for the environment comprises capturing an image of the environment with a forward facing camera on the mobile platform.

7. The method of claim 6, wherein using the position of the user with respect to the mobile platform to determine a portion of the display information to display comprises cropping the image of the environment to produce the portion of the image that is aligned with the line of sight.

8. The method of claim 1, wherein using the position of the user with respect to the mobile platform to determine a portion of the display information to display comprises determining a field of view based on a position and orientation of the mobile platform and the position of the user with respect to the mobile platform, and retrieving augmented reality data based on the field of view.

9. The method of claim 1, wherein the mobile platform comprises a forward facing camera to capture an image of the environment and a backward facing camera to capture an image of the user in order to determine the position of the user with respect to the mobile platform.

10. A mobile platform comprising:
    a forward facing camera;
    a backward facing camera;
    a processor connected to receive data from the forward facing camera and the backward facing camera;
    memory connected to the processor;
    a display connected to the memory; and
    software held in the memory and run in the processor to cause the processor to determine a position of a user with respect to the mobile platform based on an image of the user captured by the backward facing camera, provide display information for an environment, the display information comprising at least one of an image of the environment captured by the forward facing camera or augmented reality data, use the position of the user with respect to the mobile platform to determine a portion of the display information to display that is aligned with a line of sight between the user and the mobile platform, wherein the portion of the display information is less than the entirety of the display information, and to display only the portion of the display information on the display.

11. The mobile platform of claim 10, wherein the portion of the display information that is displayed comprises at least one of a portion of the image, augmented reality data, or augmented reality data over the portion of the image.

12. The mobile platform of claim 10, wherein the software causes the processor to analyze the image of the user to determine the position of the user with respect to the mobile platform.

13. The mobile platform of claim 12, wherein the software causes the processor to analyze the image of the user using biometrics to determine a distance between the mobile platform and the user and use the distance between the mobile platform and the user to further determine the portion of the display information to display, wherein an increased portion of the display information is displayed when the distance between the mobile platform and the user is decreased.

14. The mobile platform of claim 10, wherein the software causes the processor to use the position of the user with respect to the mobile platform to determine a portion of the display information to display by cropping the image to produce the portion of the image that is aligned with the line of sight.

15. The mobile platform of claim 12, wherein the software that causes the processor to use the position of the user with respect to the mobile platform to determine a portion of the display information to display comprises software to determine a field of view based on a position and orientation of the mobile platform and the position of the user with respect to the mobile platform and wherein the software causes the processor to retrieve augmented reality data based on the field of view.

16. A system comprising:
means for determining a position of a user with respect to a mobile platform;
means for providing display information for an environment, the display information comprising at least one of an image of the environment or augmented reality data;
means for using the position of the user with respect to the mobile platform to determine a portion of the display information to display that is aligned with a line of sight between the user and the mobile platform, wherein the portion of the display information is less than the entirety of the display information; and
means for displaying only the portion of the display information that is aligned with the line of sight between the user and the mobile platform when the mobile platform is facing a direction that is not along the line of sight.

17. The system of claim 16, wherein the means for displaying the portion of the display information that is aligned with the line of sight between the user and the mobile platform displays at least one of a portion of the image, augmented reality data, or augmented reality data over the portion of the image.

18. The system of claim 16, wherein the means for determining the position of the user with respect to the mobile platform comprises:
means for capturing an image of the user with a backward facing camera on the mobile platform; and
means for analyzing the image of the user to determine the position of the user with respect to the mobile platform.

19. The system of claim 16, further comprising:
means for determining a distance between the mobile platform and the user; and
means for using the distance between the mobile platform and the user to determine the portion of the display information to display, wherein an increased portion of the display information is displayed when the distance between the mobile platform and the user is decreased.

20. The system of claim 19, wherein the means for determining the distance between the mobile platform and the user comprises means for biometrically analyzing an image of the user capturing with a backward facing camera on the mobile platform to determine the distance between the mobile platform and the user.

21. A non-transitory computer-readable medium comprising program code, which, when executed by a computer, cause the computer to perform operations, the program code comprising:
program code to determine a position of a user with respect to a mobile platform based on an image of the user captured by a backward facing camera;
program code to provide display information for an environment, the display information comprising at least one of an image of the environment captured by a forward facing camera or augmented reality data;
program code to use the position of the user with respect to the mobile platform to determine a portion of the display information to display that is aligned with a line of sight between the user and the mobile platform, wherein the portion of the display information is less than the entirety of the display information; and
program code to display only the portion of the display information for the environment that is aligned with the line of sight when the mobile platform is facing a direction that is not along the line of sight.

22. The non-transitory computer-readable medium of claim 21, wherein the program code to determine the position of the user with respect to the mobile platform comprises program code to analyze the image of the user captured with the backward facing camera on the mobile platform to determine the position of the user within the image and to use the position of the user within the image to determine the position of the user with respect to the mobile platform.

23. The non-transitory computer-readable medium of claim 21, further comprising program code to determine a distance between the mobile platform and the user wherein the program code to use the position of the user with respect to the mobile platform to determine the portion of the display information to display further comprises program code to use the distance between the mobile platform and the user to determine the portion of the display information to display, wherein an increased portion of the display information is displayed when the distance between the mobile platform and the user is decreased.

* * * * *